Patented Oct. 28, 1952

2,615,892

UNITED STATES PATENT OFFICE 2,615,892

PYRIDYL AMINES

Albert M. Clifford, Stow, Ohio, assignor to Wingfoot Corporation, Akron, Ohio, a corporation of Delaware No Drawing. Application June 24, 1946,
Serial No. 678,897

7 Claims. (Cl. 260—293)

This invention relates to a method of preparing a class of complex amino compounds. Some of the amines are known to the chemical art, but have heretofore been prepared by complicated reactions.

The purpose of this invention is to provide a more convenient method of preparing these little known compounds from readily available raw materials.

It has been found that 2-vinyl pyridine readily combines by addition with primary and secondary amines in accordance with the following chemical equations.

(1)
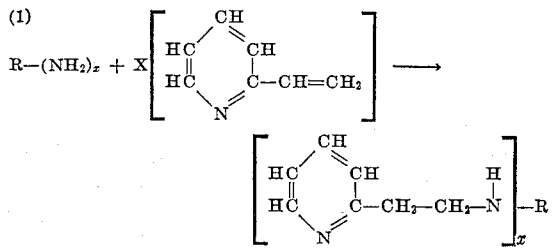

(2)
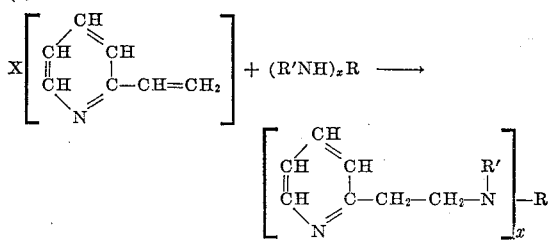

The product of equation (1), being a secondary amine, may react further with more of the 2-vinyl pyridine to form the corresponding tertiary amine thus:

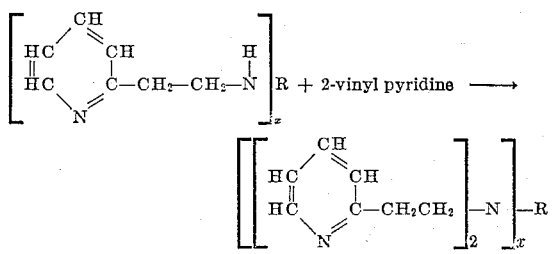

where in the foregoing chemical equations R represents any hydrocarbon, any hydrocarbon radical containing oxygen or sulfur atoms, or the corresponding hydroxy-substituted radicals each having a valence equal to X, and R' represents any monovalent hydrocarbon, any hydrocarbon radical containing oxygen or sulfur atoms, or the corresponding hydroxy-substituted radicals.

Suitable amines for the practice of this invention are the primary amines, including the alkyl amines, such as methyl amine, dodecylamine, butylamine, and octadecylamine, the arylamines, such as aniline and alpha or beta naphthylamine, the alkaryl amines, such as the toluidines, the aralkyl amines, such as phenylethylamine, and naphthylmethylamine, the cycloaliphatic amines, such as cyclohexylamine, and others such as tetrahydrofurfurylamine. The class of useful amines also includes the secondary monoamines, including the dialkylamines, such as dimethyl amine, dibutyl amine, and ethyl dodecyl amine, the diaryl amines, such as diphenyl amine and phenylnaphthyl amine, and the mixed alkyl aryl amines, such as N-methyl aniline and ethyl naphthyl amine. Other useful amines are the polyamines having more than one primary and/or secondary amino group, for example, phenylene diamine, propylene diamine, hexamethylene diamine, diethylene triamine and tetra ethylene pentamine. Other useful amines are the primary or secondary mono or polyamines of the types above described, which have one or more substituted hydroxy radicals.

Other amines in which the organic radicals attached to the nitrogen atom or atoms are not hydrocarbon radicals may also be used to practice this invention. Thus amines containing oxygen and sulfur atoms, such as ethoxy propyl amine, methyl ethoxypropyl amine, di(2-amino ethyl) sulfide, di-2-aminoethyl sulfide and ethoxybutyl 3-thia-n-amyl amine having the structural formula:

$C_2H_5O$—$C_4H_8$—NH—$CH_2CH_2$—S—$CH_2$—$CH_3$

The ether oxygen and the thio ether radicals do not interfere with the chemical processes by which the vinyl pyridine derivatives are prepared and do not adversely affect the utility of the compounds.

Still other useful amines are those secondary amines in which the nitrogen atom is attached to both valence bonds of a divalent radical, for example, morpholine, piperidine, and hexamethylene imine.

The class of useful amines may be represented by the structural formula

R—NH—R' wherein R and R' may be any radical of the group consisting of hydrocarbon radicals, hydrocarbon radicals containing oxygen and sulfur atoms, hydroxy-substituted hydrocarbon radicals, hydroxy-substituted hydrocarbon radicals containing oxygen and sulfur atoms, and the hydrogen radical, and in which no more than one of R and R' is a hydrogen radical.

The new method of preparing condensation products in accordance with this invention involves the combination of the amine as above-defined with 2-vinyl pyridine by mixing the reagents. The activity of the addition will depend upon the molecular structure of the amine, for example, aliphatic primary amines may be condensed without vigorous heating, and usually without requiring a catalyst. Secondary amines, and especially the aryl amines, should be heated to effect the condensation to the desired extent, and are preferably heated in the presence of a suitable catalyst. Catalysts which have been found to be effective in promoting the new reaction are copper acetate and acetic acid or a combination of both. The condensation products are separated from the reaction mass by vacuum distillation or by fractional crystallization from a solution in a suitable solvent.

The reaction may be conducted at atmospheric pressure in a closed or open vessel. Generally, if the amino compound is volatile at the temperature of reaction, a closed vessel is desirable, and in this case, it is recommended that the reaction be conducted in an autoclave and if desired, under pressure.

The method of this invention is useful in the preparation of pyridine derivatives which are ordinarily prepared by more complex methods. The compounds prepared in accordance with this new method are valuable as curing agents for synthetic resins, as insecticides, and for the preparation of synthetic chemicals of a wide variety, including pharmaceuticals.

Further details of the practice of this invention are set forth in the following specific examples.

Example 1

A glass reaction flask provided with a water-cooled reflux condenser was charged with 72.6 grams of piperidine and 90.0 grams of vinyl pyridine. Then the contents of the flask were heated to reflux temperature and so maintained for 10 hours. The reaction mass was then transferred to a distillation flask and the fraction boiling at 115° C. and 3 mm. total pressure was separated. This distilled fraction was identified as 2-(2-pyridyl) ethyl penta, having the structural formula:

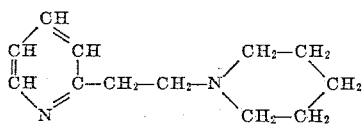

Example 2

Using a reaction vessel and distillation flask similar to that used in the preceding experiment, 87 grams of monoamyl amine and 105 grams of vinyl pyridine were reacted by refluxing for 12 hours. Upon distillation a product was separated which was identified as 2-(2-pyridyl) ethylamylamine, having the structural formula as follows:

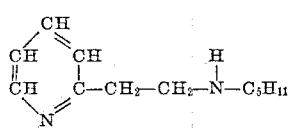

Example 3

Using the reaction and distillation apparatus described in Example 1, 93 grams of aniline and 105 grams of vinyl pyridine were reacted. In addition, a catalyst of 4.5 grams of acetic acid and 0.7 gram of copper acetate was added. The reflux was continued for a 10 hour period. The following fractions were separated by distillation.

| Fraction | Temperature, ° C. | Grams |
| --- | --- | --- |
| 1 | Up to 148° C./2 mm | 30 |
| 2 | 148–180° C./2 mm | 140 |
| Residue | | 30 |

Redistillation of Fraction 2 produced 88 grams of an amine boiling at 175° C./2 mm. and having a melting point of 141 to 143° C. This compound was identified as 2-(2-pyridyl)-ethyl phenylamine, having the structural formula

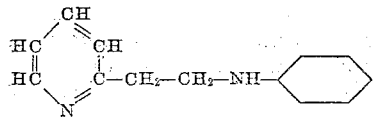

Example 4

Using the apparatus described in Example 1, 61 grams of ethanolamine and 105 grams of vinyl pyridine were reacted by refluxing for 6 hours. Distillation of the resulting reaction mass produced a substantial quantity of a compound identified as 2-(2-pyridyl)-ethyl hydroxy ethylamine having the structural formula

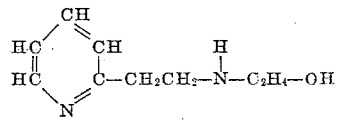

By procedures analogous to those described in the preceding experiments, vinyl pyridine may be condensed with methylamine, dimethylamine, other alkyl or dialkyl amines, cyclohexylamine, any methylcyclohexylamines, including the N-methyl cyclohexylamine, hexamethylene imine, propylene diamine, aniline, ortho-toluidine, N-methyl aniline, phenylene diamines, amino phenol and benzidine.

Although the invention has been decribed with respect to specific modifications thereof, it is not intended that the details described shall be construed as limitations upon the scope of the invention except to the extent incorporated in the following claims.

I claim:

1. A method of preparing 2-(2-pyridyl) ethyl amines which comprises heating a mixture comprising as the sole reactive ingredients 2-vinyl pyridine and an amine having a hydrogen attached directly to the amino nitrogen atom until the reaction is substantially complete and separating the resulting product.

2. A method of preparing 2-(2-pyridyl) ethyl amines which comprises heating a mixture comprising as the sole reactive ingredients 2-vinyl pyridine and a primary alkyl amine having a hydrogen attached directly to the amino nitrogen atom until the reaction is substantially complete and separating the resulting product.

3. A method of preparing a 2-(2-pyridyl) ethyl amine which comprises heating a mixture comprising as the sole reactive ingredients 2-vinyl pyridine and monoamyl amine until the reaction is substantially complete and separating the resulting product.

4. A method of preparing 2-(2-pyridyl) ethyl amines which comprises heating a mixture comprising as the sole reactive ingredients 2-vinyl pyridine and a primary aryl amine having a hydrogen attached directly to the amino nitrogen atom until the reaction is substantially complete and separating the resulting product.

5. A method of preparing a 2-(2-pyridyl) ethyl amine which comprises heating a mixture comprising as the sole reactive ingredients 2-vinyl pyridine and aniline until the reaction is substantially complete and separating the resulting product.

6. A method of preparing a 2-(2-pyridyl) ethyl amine which comprises heating a mixture comprising as the sole reactive ingredients 2-vinyl pyridine and piperidine until the reaction is substantially complete and separating the resulting product.

7. A method of preparing a 2-(2-pyridyl) ethylamine which comprises heating a mixture comprising as the sole reactive ingredients a 2-vinylpyridine and an amine of the group consisting of a primary amine and a secondary amine and recovering the 2-aminoethyl pyridine from the reaction mixture.

ALBERT M. CLIFFORD.

REFERENCES CITED

The following references are of record in the file of this patent:

UNITED STATES PATENTS

| Number | Name | Date |
| --- | --- | --- |
| 2,191,564 | Graenacher et al. | Feb. 27, 1940 |
| 2,198,961 | Dietrech | Apr. 30, 1940 |

FOREIGN PATENTS

| Number | Country | Date |
| --- | --- | --- |
| 510,457 | Great Britain | Aug. 2, 1939 |

OTHER REFERENCES

Laeffler: Berichte der Deuchen, vol. 37, p. 167.

Laeffler et al.: Berichte der Deuchen, vol. 38, p. 3329.

Ladenburg: Ber. der Deu., Cohen, vol. 20, (1887), pp. 1643 and 1644.

Ellis: Chemistry of Petroleum Derivatives, Reinhold Pub. Co., (1937), vol. II, pp. 614 and 615.